United States Patent [19]
Kigane et al.

[11] 3,895,134

[45] July 15, 1975

[54] PROCESS FOR PRODUCING MICROPOROUS STRUCTURES

[75] Inventors: Koji Kigane; Masahisa Mimura; Nobuo Ohkawa, all of Mihara, Japan

[73] Assignee: Teijin Cordley Ltd., Osaka, Japan

[22] Filed: May 8, 1973

[21] Appl. No.: 358,328

[30] Foreign Application Priority Data

May 13, 1972  Japan.............................. 47-47504
Dec. 27, 1972  Japan.............................. 47-2247

[52] U.S. Cl................................ 427/246; 117/76 T
[51] Int. Cl................................................. C09d 5/18
[58] Field of Search....... 117/161 KP, 135.5, 140 R, 117/140 A, 76 T; 260/29.6 TN, 77.5 Q, 858

[56] References Cited
UNITED STATES PATENTS

| | | | |
|---|---|---|---|
| 3,100,721 | 8/1963 | Holden | 117/161 KP |
| 3,255,030 | 6/1966 | Storti | 117/161 KP |
| 3,360,394 | 12/1967 | Griffin et al. | 117/161 KP |
| 3,415,768 | 12/1968 | Dieterich et al. | 260/29.2 TN |
| 3,622,527 | 11/1971 | Dieterich et al. | 260/29.2 TN X |
| 3,666,542 | 5/1972 | Kigane et al. | 117/135.5 |
| 3,763,054 | 10/1973 | Reischl et al. | 260/77.5 Q |

*Primary Examiner*—William D. Martin
*Assistant Examiner*—Theodore G. Davis
*Attorney, Agent, or Firm*—Sherman and Shalloway

[57] ABSTRACT

Process for producing a microporous structure of a polyurethane having superior properties, such as, for instance, vapor permeability, feel, appearance, light weight and mechanical strength, which comprises (1) preparing a solution or suspension of a specific ionic hydrophilic group-containing and polyoxyethylene segment-free polyurethane elastomer or said elastomer-containing polyurethane elastomer mixture in an organic solvent having limited boiling point and solubility; (2) mixing the resulting solution or suspension with water in the specific amount needed to prepare a dispersion; (3) coating or impregnating a substrate with the resulting suspension; (4) selectively evaporating the organic solvent; and (5) drying the resulting product.

4 Claims, 1 Drawing Figure

PROCESS FOR PRODUCING MICROPOROUS STRUCTURES

SUMMARY OF THE INVENTION

This invention relates to a process for producing a microporous structure of a polyurethane having various superior properties suitable for use as artificial leather. More specifically, the invention relates to a process for producing a microporous structure of a polyurethane having superior vapor permeability, feel, appearance, light weight and mechanical strength and improved suppleness, cold resistance, heat resistance, dyeability and high frequency processability with good quality reproducibility.

DESCRIPTION OF THE PREFERRED EMBODIMENTS

In particular, the invention provides a process for producing a microporous structure, which essentially comprises the steps of:

1. preparing a solution or suspension of a resinous component in an organic solvent having a boiling point lower than 120°C., the solubility at 25°C. of water in said organic solvent being from 1 to 50 g per 100 g of said solvent, said solution or suspension having a solid resin content of 5 to 30 % by weight, said resinous component comprising more than 70 % by weight of a polyurethane elastomer selected from the group consisting of A. a polyurethane elastomer free from polyoxyethylene segments which contains an ionic hydrophilic group, in an amount of 10 to 98 % by weight of the critical amount of hydrophilic groups in the elastomer in regard to phase inversion as defined in the specification, which is selected from the group consisting of and B. a mixture of at least 50 % by weight of said polyurethane elastomer (A) with not more than 50 % by weight of a polyurethane elastomer free from hydrophilic segments;

2. mixing the resulting organic solvent solution or suspension with water in an amount of from 10 to 95 % by weight of the critical amount of water to prepare a dispersion;

3. coating or impregnating a substrate with the resulting dispersion;

4. selectively evaporating said organic solvent from the coated or impregnated substrate at a temperature not higher than 80°C. and at least 10°C. lower than the boiling point of the lowest boiling constituent of said organic solvent, thereby to gel said resinous component; and 5. drying the product obtained in step (4).

The present invention relates to an improvement of the process disclosed in German OLS 2004276 (corresponding to U.S. Pat. No. 3,666,542 patented May 30, 1972). This patent discloses a method for producing a microporous structure having high vapor permeability and superior durability with economical advantage by employing the dry method using an aqueous slurry consisting mainly of an organic solvent, a polyurethane containing polyoxyethylene segments, and water. In this method, the use of the polyurethane having polyoxyethylene segments is essential. The resulting microporous structure possesses superior properties to those known before the German OLS. The present invention provides a method of producing a microporous structure having more improved properties such as cold resistance, suppleness, heat resistance, dyeability and high frequency processability.

Accordingly, an object of this invention is to provide a process for producing a microporous structure with good quality reproducibility which possesses superior vapor permeability, feel, appearance, light weight, mechanical strength, suppleness, cold resistance, heat resistance, dyeability and high frequency processability.

Many other objects of this invention along with its advantages will become more apparent from the following description.

The method of this invention consists essentially of step (1) of preparing a solution or suspension of a resinous component in an organic solvent, step (2) of mixing the resulting solution or suspension with water, step (3) of coating or impregnating a substrate with the resulting dispersion, step (4) of selective evaporation and step (5) of drying.

The organic solvent for the polyurethane elastomer used in step (1) need not be one capable of dissolving the elastomer, but may be one capable of forming a suspension of the elastomer. The following two properties are required of this organic solvent.

a. It should have a boiling point lower than 120°C.
   b. It should be capable of dissolving water in a specific amount.

If the organic solvent does not have property (a), the selective evaporation in step (4) becomes difficult or impossible, and it becomes practically impossible to form the desired microporous structures. If the requirement (b) is not met, it becomes difficult or even impossible to form a stable dispersion in step (2).

Examples of the solvent which meets the above-mentioned requirements (a) and (b) are methylethyl ketone, methyl-n-propyl ketone, methylisobutyl ketone, diethyl ketone, methyl formate, ethyl formate, n-propyl formate, methyl acetate, ethyl acetate, isopropyl acetate, isobutyl acetate, secondary-butyl acetate, and 1,2-dichloroethane. It is also permissible to use a mixed solvent prepared by blending a solvent having a greater ability to dissolve water, such as acetone, tetrahydrofuran or dioxane, with any of the above cited solvents, or benzene, toluene or n-hexane in a manner such that the solubility (at 25°C.) of water in the resulting mixed solvent will be 1 to 50 g per 100 g of the solvent. Especially preferred solvents are methylethyl ketone, diethyl ketone, methyl acetate, and admixtures of tetrahydrofuran and any of the above-mentioned solvents.

The resinous component used in the process of this invention comprises more than 70 % by weight, preferably more than 80 % by weight, more preferably more than 90 % by weight, of the polyurethane elastomer (A) or (B) described below.

A. A polyurethane elastomer free from polyoxyethylene segments which contains an ionic hydrophilic group in an amount of 10 to 98 % by weight of the critical amount of hydrophilic groups in the elastomer in regard to phase inversion to be defined hereinbelow, which hydrophilic group is selected from the group consisting of B. A mixture of not less than 50 % by weight of the polyurethane elastomer (A) with not more than 50 % by weight of a polyurethane elastomer free from hydrophilic segments.

The resinous component may contain not more than 30 % by weight, preferably not more than 20 % by weight, more preferably not more than 10 % by weight, of another polymer which is a homo- or co-polymer having no polyoxyethylene segments. Examples of such a polymer include polymers having no hydrophilic segments, for example, chloride, polyvinylidene chloride, an acrylate ester co-colymer, polystyrene, an ethylene terephthalate/ ethylene isophthalate copolymer and a polyester polyether copolymer, and also polymers containing hydrophilic segments, for example, cellulose acetate, ethyl cellulose, and butyl cellulose. Of these, the polymers having no hydrophilic segments are preferred. The use of these other polymers serves to improve the feel or appearance of the resulting microporous structure to a greater extent.

The polyurethane elastomer (A) is preferably a polyurethane elastomer consisting of (*a*) a long-chain diol of a polyester having a molecular weight of 500 to 4,000, (*b*) an organic diisocyanate and (*c*) a bifunctional active hydrogen compound having a molecular weight of 60 to 450, at least one of said components, (*a*), (*b*) and (*c*) having an ionic hydrophilic group selected from the group consisting of and the urethane linkage expressed by of the polyurethane elastomer containing 1.5 to 6.5 % by weight, based on the polyurethane elastomer, of nitrogen.

An examples of the polyurethane elastomer having no hydrophilic segments to be used with not less than the polurethane elastomer (A) to form the polyurethane elastomer (B) is an elastomer consisting of (*a*) a long-chain diol of a polyester having a molecular weight of 500 to 4,000, (*b*) an organic diisocyanate and (*c*) a bifunctional active hydrogen compound having a molecular weight of 60 to 450, the urethane linkage expressed by in the elastomer containing 1.5 to 6.5 % by weight, based on the elastomer, of nitrogen.

The term "the critical amount of hydrophilic groups in the elastomer in regard to phase invention (which may sometimes be referred to simply as C.A.H.P.)" denotes the maximum amount (in % by weight) of the ionic hydrophilic groups of a polyurethane elastomer which give rise to a water-in-oil emulsion but not an oil-in-water emulsion when water is added to a solution or suspension of said elastomer in an organic solvent.

Figure 1:
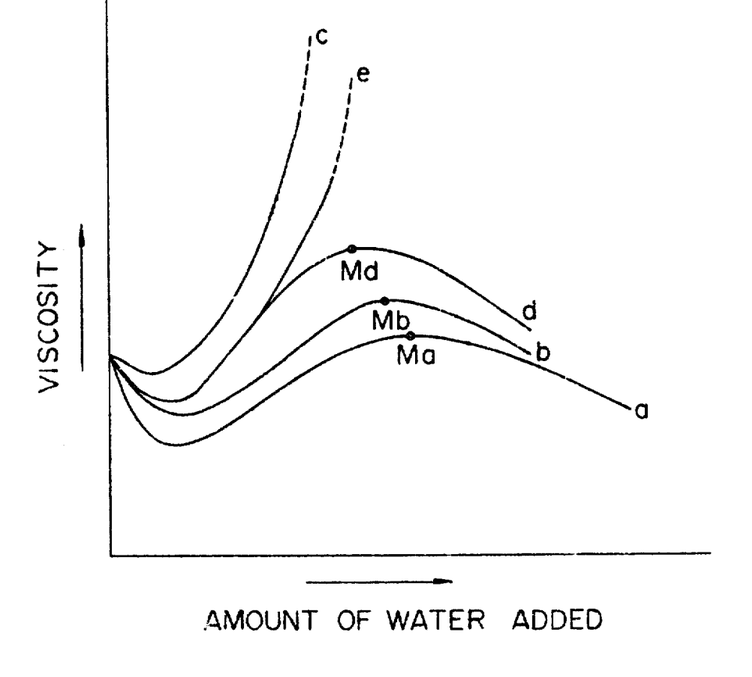
The accompanying drawing is a series of curves showing the relationship between the amount of water added and the viscosity, for a solution or suspension of a resinous component in an organic solvent, with water added.

This maximum amount can vary according to such factors as the composition of the polyurethane elastomer, the proportions of the constituents of the elastomer, the type of the organic solvent, or the concentration of the polyurethane elastomer in the solution or suspension, and can be measured as follows:

500 g of a solution or suspension of a polyurethane elastomer (X) containing a hydrophilic group (x) in an organic solvent (Y) in a concentration (*p*) is placed in a vessel equipped with a stirrer. While the temperature of the solution or suspension is maintained at 30°C., 200 ml. of water held at 30°C. is added at a rate of 10 ml./min. with stirring to ensure uniform mixing of the water. When every given amount (for example, 20 ml.) of water has been added, the addition of water is stopped, and the viscosity (centipoises) of the contents of the vessel is measured by a B-type viscometer. The relation between the amount of water added and the viscosity of the contents is plotted on a graph to obtain a curve *a*, for example, shown in the accompanying drawing. The polyurethane elastomer (X) having a maximum point M*a* as shown by the curve *a* cannot be used as a solution or suspension in the organic solvent (Y), because when water is added to the solution or suspension to form a dispersion, it becomes an o/w type dispersion in the region on the right side of the maximum point M*a* in the drawing. Then, the same test as above described is performed on a polyurethane elastomer (X') of the same composition except that it has a reduced amount of the hydrophilic group (*x*), and a curve *b*, for example, shown in the drawing is obtained. This elastomer (X') also has a maximum point M*b*, and cannot be used for the same reason as stated above. Furthermore, the same test is performed on a polyurethane elastomer (X'') of the same composition except that the amount of the hydrophilic group (*x*) is further reduced. Thus, a curve *c*, for example, shown in the drawing is obtained. This elastomer (X″) which gives rise to a curve having no maximum point cannot form an o/w dispersion when its solution or suspension in the organic solvent (Y) in the concentration (p) is admixed with water. The curve necessary for determining C.A.H.P. is one which is obtainable just before the curve b results. Now, the same test as above is performed on a polyurethane elastomer (X‴) of the same composition except that the amount of the hydrophilic group (x) is increased as compared with the elastomer (X″) but is smaller than that of the elastomer (X′). As a result, a curve d having a maximum point Md is obtained, for example. Furthermore, the same test as above is performed on a polyurethane elastomer (X⁗) of the same composition except that the amount of the hydrophilic group (x) is somewhat smaller than that of the elastomer (X‴). This results in a curve e, for example, required for determining C.A.H.P. This trial-and-error type test can be easily determined beforehand.

Thus, C.A.H.P. of the elastomer (X) containing the hydrophilic group (x) in regard to its solution or suspension in solvent (Y) in concentration (p) can be determined by the following equation.

C.A.H.P. = The amount of the hydrophilic group (x) in elastomer (X⁗)/The weight of elastomer (X⁗) × 100

The polyurethane elastomer (A) can be easily prepared, for example, by a method comprising forming a substantially isocyanate-terminated prepolymer from a water-insoluble long-chain diol and a molar excess of a hydrophobic organic diisocyanate, and subjecting the prepolymer to a chain-extending reaction in a solvent, wherein at least one of the organic diisocyanate, long-chain diol, a chain extender, and an end-blocking agent is a compound capable of forming the ionic hydrophilic group described hereinabove.

Examples of the organic diisocyanate compound used to form the polyurethane elastomer (A) are 4,4′-diphenylmethane diisocyanate, 1,3-xylylene diisocyanate, 1,4-xylylene diisocyanate, 2,4-tolylene diisocyanate, 2,6-tolylene diisocyanate, 1,5-naphthalene diisocyanate, m-phenylene diisocyanate, and p-phenylene diisocyanate.

Examples of the water-insoluble long-chain diol include polyethylene adipate, polyethylenepropylene adipate (ethylene/propylene molar ratio = 100/0 to 80/20), polyethylenebutylene adipate, polydiethylene adipate, polybutylene adipate, polyethylene succinate, polybutylene succinate, polyethylene sebacate, and polybutylene sebacate, all of which have a molecular weight of 500 to 4,000 and are substantially hydroxyl-terminated.

In view of the above-mentioned properties of the organic solvent to be used in this invention, it is preferred to employ aliphatic glycols of two to 10 carbon atoms as the water-insoluble chain-extender. Examples of the aliphatic glycols are ethylene glycol, propylene glycol, 1,3-propane diol, diethylene glycol, 1,4-butadiene diol, 1,6-hexanne diol, 1,8-octane diol and 1,10-decane diol. A combination of such a glycol with a bifunctional amino compound may also be used. In this case, chain-extension is effected to some extent by the above glycol and then the remainder of the chain-extension is accomplished by the bifunctional amino compound. Examples of such bifunctional amino compound are ethylene diamine, propylene diamine, trimethylene diamine, tetramethylene diamine, hexamethylene diamine, decamethylene diamine, m-xylylene diamine, p-xylylene diamine, benzidine, 4,4′-diaminodiphenyl methane, m-phenylene diamine, hydrazine, methylhydrazine, and amino-acetic hydrazide.

The chain-extender capable of becoming hydrophilic may, for example, be the following compounds (1) to (5).

1. Compounds containing two hydroxyl groups and a carboxylic acid, such as dihydroxymaleic acid, dihydroxyfumaric acid, tartaric acid, 2,6-dihydroxybenzoic acid, protocatechuic acid, α-resorcylic acid, β-resorcylic acid, hydroquinone-2,5-dicarboxylic acid, 4,6-dihydroxyisophthalic acid, and 2,8-dihydroxynaphthoic acid-(3).
2. Compounds having two hydroxyl groups and a sulfornic acid, such as 1,7-dihydroxynaphthalene-sulfornic acid -(3), 1,8-dihydroxynaphthalene-disulfonic acid-(2,4), chromotropic acid, pentaerythrit-bis-benzosulfonate, or glycerine-mono-methanesulfonate.
3. Phosphines such as diethyl-β-hydroxyethyl phosphine, methyl-bis-β-hydroxyethyl phosphine, tris-β-hydroxymethyl-phoephine- bis-(α- hydroxyisopropyl)-phosphinic acid, hydroxyalkanephosphinic acid, or phosphoric acid-bis-glycol ester.
4. Thioethers such as thiodiethanol, thiodibutanol, diisopropanol-(2)-sulfide, dihydroxy-dihexylsulfide, diaminodipropyl sulfide, bis-(β-hydroxy-β-phenyl-ethyl)-sulfide, 5-methyl-thioglycerine, thiodiglycolic acid, sulfide-β-dipropionic acid, or sulfide-α-dibutyric acid.
5. Amines, compounds containing two active carbons and at least one tertiary amino group, such as N-methyldiethanol amine, N-butyldiethanol amine, N-oleyldiethanolamine, N-cyclohexyldiethanol amine, N-methyldiisopropanal amine, or N,N-dihydroxyethyl aniline.

As a salt-forming agent for the compounds of groups (1) and (2), an organic or inorganic base such as sodium hydroxide, potassium hydroxide, potassium carbonate, sodium bicarbonate, ammonia, a primary, secondary, or tertiary amine is suitable. For the compounds of groups (3) and (4), an alkylating agent is used as a salt-forming agent. Examples of the alkylating agent are methyl chloride, methyl bromide, butyl bromide, dimethyl sulfate, diethyl sulfate, benzyl chloride, p-nitrobenzyl chloride, benzyl bromide, ethylenechlorohydrin, ethylenebromohydrin, epichlorohydrin, ethylene oxide, propylene oxide, bromobutane, and p-toluenesulfonic acid ester. For the compounds of group (5), an organic or inorganic acid, a reactive halogen-containing compound, or the corresponding strong acid ester can be used as a salt-forming agent.

The chain-extender capable of becoming hydrophilic desirably contains a low-molecular-weight diol as a main constituent in view of the character of the solvent, but it may be a compound containing two amino groups and a carboxylic acid, sulfonic acid, phosphide phosphorus atom, or sulfonide sulfur atom.

As a polyol capable of becoming a hydrophilic group, a hydroxyl-terminated polyester formed between the above diol and a dicarboxylic acid can be cited. Or it is also possible to introduce a group capable of acting as the alkylating agent into the polyurethane molecule chain, and then forming a salt using a phosphide or sulfonide.

Examples of the long-chain diol having a hydrophilic group or a group capable of becoming a hydrophilic group are substantially hydroxyl-terminated polyesters having a molecular weight of 500 to 4,000 and containing an aliphatically bonded reactive halogen atom, polyesters containing a tertiary amino group, polyesters containing a tertiary amine salt, and polyesters containing a quaternary amine salt.

The diisocyanate compound containing a hydrophilic group or a group capable of becoming hydrophilic may, for example, be bis-chloromethyl diphenylmethane diisocyanate, 2,4-diisocyanate benzyl chloride, or 2,6-dissocyanate benzyl chloride. The group capable of becoming hydrophilic, which is bonded to the diisocyanate compound, that is, the halogen atom, can be converted to a hydrophilic group as a quaternary ammonium salt by being quaternized with at least one basic compound having a tertiary amino group capable of reacting with the halogen atom of trimethylamine, triethylamine, tributylamine, pyridine, or triethanolamine to effect quaternization.

The content of the hydrophilic group (or the intensity of hydrophilicity) of the polyurethane elastomer (A) free from polyoxyethylene segments and having the ionix hydrophilic group as described hereinabove can be expressed in % by weight of the ionic groups contained in the polymer. If the polymer has a small content of the ionic groups, it is impossible to disperse water stably in a solution or slurry of the polymer in an amount sufficient for obtaining a microporous film. Also, if the content of the ionic groups is too large, the polymer solution or slurry changes from a w/o type to o/w type emulsion (aqueous latex) thus making it impossible to obtain the desired microporous film.

The amount of the hydrophilic group required to obtain the desired microporous structure varies according to the composition of the polymer, the type of the hydrophilic group, the type of the solvent or the concentration of the polymer. For example, with a 20 % methylethyl ketone solution of a polyurethane elastomer of which urethane group contains 3.5 % of nitrogen, the amount of the hydrophilic group is 0.01 to 0.13 % for

0.04–0.39 % for 0.05–0.49 % for 0.03–0.29 % for —COO⁻, 0.06–0.59 % for —SO₂O⁻, and 0.06–0.59 % for The preparation of the polyurethane elastomer containing a hydrophilic group can be effected by any of the following methods.

1. A method wherein the starting materials themselves contain an ionic hydrophilic group.
2. A method wherein after polymerization reaction, an ionic hydrophilic group is formed.
3. A method wherein both the polymerization reaction and the reaction of forming an ionic hydrophilic group are performed at the same time. The choice of these methods depends upon the properties of the starting materials and the rate of polymerization reaction.

Such a polyurethane elastomer (A) serves as if it were an emulsifying agent for the hydrophobic polyurethane used for producing the polyurethane elastomer (B) and the other polymerss to be used conjointly with the elastomer (A) or (B). The resin component present in the solution or suspension prepared in step (1) of the process of this invention comprises more than 50 % by weight of the elastomer (A). Of course, the resinous component may consist solely of the elastomer (A).

The polyurethane elastomer containing no hydrophilic segments that can be used with the elastomer (A) in an amount of not more than 50 % by weight to form the polyurethane elastomer (B) can be prepared from the same combination of reactants as above described except having no hydrophilic group or its derivative. Since such a polymer consists of hydrophobic structural units, a stable dispersion cannot be formed even when water is mixed with a solution or suspension of this polymer in the above-mentioned solvent. However, when this polymer is used as an admixture with the above polyurethane elastomer (A) in the amount specified above, the hydrophobic residue of the polyurethane elastomer (A) becomes compatible with the polyurethane elastomer having no hydrophilic segments, and by dint of the hydrophilic group of the polyurethane elastomer (A), water is dispersed stably to provide an excellent coating or impregnating dispersion.

The organic solvent solution or suspension of the resinous component prepared in step (1) of the method of this invention is mixed with water in an amount of 10 to 95 % by weight of the critical amount of water to prepare a dispersion.

The "critical amount of water (C.A.W.)", as used in the present specification, has the following meaning.

When a solution or suspension of the polyurethane elastomer (A) containing 10 – 98 % by weight, based on C.A.H.P., of an ionic hydrophilic group is admixed with water, the viscosity of the admixture increases with an increase in the amount of water added. When the amount of water reaches a certain level, the resinous component including the elastomer (A) will gel or the water will become freed from the admixture. The point at which this gellation or water separation occurs is called a critical point, and the amount of water added until this point has been reached is called a critical amount of water added (C.A.W. for short). The amount added of water is expressed in grams per 100 g of the organic solvent solution or suspension of the resinous component. The critical point can be simply determined by discovering the separation of water on the surface of the dispersion by the naked eye.

In accordance with this invention, a dispersion is formed by adding water to a solution or suspension of the above-mentioned resinous component in the organic solvent. By the "suspension of the resinous component" referred to herein is meant a system of the resinous component in the organic solvent which takes an opaque appearance because the resinous component is not completely dissolved in the organic solvent but is partially contained therein in the form of insoluble particles. The term "dispersion" denotes a system where water added is present in the state at least partially dispersed in the solution or suspension of the resinous component in the organic solvent.

The water added to the resulting organic solvent solution or suspension in an amount of 10 to 95 % by weight of the critical amount of water is very stably held in the dispersion by the synergistic effect of the polyurethane elastomer (A) containing both a hydrophilic group and a hydrophobic group and the solvent having a limited solubilizing power. The dispersion assumes a white creamy color in appearance, clearly showing that water is emulsified and dispersed by the specific elastomer (A).

If the amount of water to be added to form the dispersion is less than 10 % of C.A.W., a sheet having a high density and some transparency was obtained, and the intended microporous sheet is difficult to prepare. If it exceeds 95 % of C.A.W., the resulting dispersion is unstable, and has a great tendency to free the water.

Various means are employed to mix the solution or dispersion with water in step (2). Among them are:

1. means whereby water is added batchwise to the resulting organic solvent solution or suspension.
2. means whereby the resulting organic solvent solution or suspension is continuously mixed with water.

Irrespective of the method of mixing employed, there is an advantage that local coagulation of the polymer does not occur easily when water is added, because the solvent used has a limited water solubilizing power.

Known additives such as a dyestuff, pigment, softener, crosslinking agent, stabilizer or filler may be added to the dispersion, as far as the addition does not destroy the dispersion system. The dispersion contains usually 3 to 28 % by weight, preferably 8 to 20 % by weight, of solids.

In the next step of the process of this invention, a substrate is coated or impregnated with the resulting dispersion.

Various substrates including many kinds of woven or knitted fabrics, non-woven fabrics, and similar materials, may be used depending upon the intended use of the end product. Furthermore, so-called impregnated substrates prepared by impregnating the above-mentioned substrate materials with resins may be used.

If an appropriate coating support is used as the substrate and coated, and the support is stripped off after evaporation and drying, a microporous film useful as a surface of an artificial leather can be obtained. The support may be a plastic film, silicone-coated paper, glass sheet, metal sheet or metal foil.

The application of the dispersion to the substrate can be effected by dipping, knife coating, roll coating, casting, spraying or other suitable known means. The "coating or impregnation," referred to herein, denotes not only both of the unit coating and impregnation operation, but also the operation in which coating is effected immediately after the impregnation of the substrate, during the selective evaporation of the organic solvent, or after drying.

If step (3) is performed in accordance with the last-mentioned embodiment, it is preferred to perform step (3) in two stages, the first stage consisting in impregnating a substrate with the resulting dispersion, and the second stage consisting in coating the impregnated substrate with a dispersion containing another polyurethane elastomer (A) containing an ionic hydrophilic group having the opposite polarity to the ion of the hydrophilic group of the polyurethane elastomer (A) contained in the dispersion prepared in step (2).

By subjecting the coated and impregnated substrate to the selective evaporation step (4), the adhesion between the impregnated layer and the coated layer becomes firmer, and the resistance to separation between the layers can be further improved. This further improvement can be achieved by selecting another polyurethane elastomer (A) having an anionic hydrophilic group as a coating dispersion when a dispersion containing an elastomer (A) containing a cationic hydrophilic group is impregnated into the substrate, and by using a dispersion containing an elastomer (A) containing a cationic hydrophilic group when a dispersion containing an elastomer (A) having an anionic hydrophilic group is used to impregnate the substrate. At this time, it is preferred that after fully impregnating the substrate (preferably a nonwoven fabric) with the dispersion, the amount of the dispersion be adjusted to not more than 80 % of the saturated liquid content.

The term "saturated liquid content" denotes the amount of the dispersion that can be filled in the spaces among the fibers of the substrate, and can be expressed by the following equation.

Saturated liquid content $= ( 1 - \sigma a/\sigma f ) $ h.$S.\sigma_s$ wherein $\sigma_s$ is the specific gravity of the aqueous dispersion, $\sigma_a$ is the apparent density of the substrate, $\sigma_f$ is the density of the fibers constituting the substrate, h is the thickness of the substrate, and S is the surface area of the substrate.

Accordingly, when it is desired to squeeze the substrate to an extent of 80 % of the saturated liquid content, it may be squeezed until its thickness is reduced to *80 %*, assuming that the surface area of the substrate does not differ before and after squeezing.

In the next step of the process of this invention, the organic solvent is selectively evaporated from the coated or impregnated substrate at a temperature not higher than 80°C. and at least 10°C. lower than the boiling point (the boiling point of the solvent itself where the organic solvent used consists only of one kind of a solvent) of the lowest boiling constituent of the organic solvent thereby to gel the resinous component. After this step, the product is dried.

In the selective evaporation step, it is necessary to evaporate the solvent selectively while preventing the evaporation of water as much as possible. (By the term "selective evaporation" is meant an evaporation conducted in a manner such that the ratio of water to the organic solvent contained in the applied dispersion increases with the lapse of the time of evaporation.) If much water is evaporated together with the evaporation of the organic solvent, the resinous component is not gelled in the microporous state, and a microporous structure having a high vapor permeability cannot be obtained.

A temperature above 80°C. is too near the boiling point of water and it becomes difficult to prevent the evaporation of water. As a result, it is impossible to obtain a microporous structure having excellent quality. At a temperature lower than 10°C. below the temperature at which the constituent of the organic solvent having the lowest boiling point boils, the solvent is evaporated too rapidly, and macropores visible to the naked eye are prone to appear in the dispersion layer applied onto the substrate. In view of other factors giving influences to the evaporation velocity of the organic solvent such as humidity and drying air speed, it is preferred to perform the selective evaporation of the solvent at a rate of less than 100 g/m²/min. In accordance with a preferred embodiment, the selective evaporation of the solvent is conducted in such a manner that the evaporation is effected at a rate of less than 20 g/m²/min. until at least 10 % by weight of the solvent is evaporated and then the evaporation is continued at a higher rate but less than 100 g/m²/min.

The time required for the selective evaporation must be at least long enough for the whole dispersion applied to the substrate to reach the gellation point. The gellation point means the point where at least 70 % by weight of the solvent originally contained in the dispersion has been evaporated and hence, the resinous component of the dispersion is coagulated. More specifically, the gellation point denotes the point where the resinous component in the dispersion applied to a substrate of a sheet or plate form having a smooth surface is coagulated to such an extent that a coating thereof can be stripped from the substrate in the form of a film.

When the selective evaporation of the organic solvent is completed, the resulting structure is coagulated to such a degree that the intended microporous structure can be obtained only by drying it withoug treatment with a coagulation bath, though a small amount of the organic solvent still remains therein. In the drying step, the remaining solvent is removed together with water. The drying is usually carried out for 5 to 30 minutes at 60°to 120° C. The dried product can be directly used for various purposes, but by heat treatment, for instance at 130° to 160° C. for 5 to 20 minutes, its properties can be improved, in respect, for instance, of abrasion resistance and flexural fatigue resistance without affecting the high velocity of vapor permeability of the microporous structure.

As described above, a microporous structure can be obtained only by the selective evaporation of the solvent and subsequent drying. Where a high level of supplness is required, it is especially advantageous to bring the dispersion-impregnated substrate into contact with water for a short period of time prior to the selective evaporation of the solvent. The contact with water makes it possible to prevent troubles which may occur at the time of bonding between the substrate and the impregnating resin. Furthermore, since this contacting results in a preliminary coagulation of the dispersion, migration of the solvent at the time of its evaporation can be prevented. Thus, it is possible to impart to the microporous structure such a supplness that couls not be expected. Since the solvent used has poor mutual solubility in water, water is present in the dispersed state in the dispersion. Thus when the dispersion-impregnated substrate comes into contact with water, the dispersed state of the dispersion is destroyed especially at the surface of the substrate, and as a result, a somewhat large quantity of water is retained between the substrate and the resin.

Since this contacting with water is intended to destroy the dispersion at the surface of the substrate and not to remove the solvent, the time required for the contacting may be not more than 5 minutes. The contact with water can be effected by various methods such as dipping or spraying.

According to this invention, natural and/or synthetic staple fibers may be added to the dispersion. Examples of preferred staple fibers are those of nylon, rayon, acetate, acrylic, polyvinyl chloride and polyester, all having a fineness of less that 3 denier and a fiber length of 1 to 10 mm. The incorporation of such staple fibers in the dispersion may alter the feel and appearance of the porous material according to the type, shape and amount of the staple fibers added. Thus, it is possible to obtain a microporous structure having more superior vapor permeability and durability and also a leather-like feel and appearance suitable for various uses.

A top coating may, if desired, be applied to the surface of the microporous structure obtained by the process of this invention. The top coating may be prepared from a resin such as a polyurethane resin, acrylic resin, vinyl chloride resin, polyamino acid resin, polyester elastomer resin, or cellulosic resin.

The process of this invention makes it possible to produce rapidly and economically a microporous structure capable of use in various forms. For example, a microporous structure obtained by using a knitted, woven or non-woven fabric or a similar material as a substrate can be used as such, or after association with other sheet materials. If desired, the structure so obtained is used as a substrate to which is applied a microporous film which has been prepared separately. These microporous structures may be widely utilized in clothing, bags, and shoe-uppers as leather substitutes.

This invention will not be described in greater detail by referring to Examples. All parts and percentages are by weight unless otherwise indicated.

Values of properties of the products obtained in the Examples are those measured in accordance with the following methods.

1. APPARENT DENSITY

The value was obtained by dividing the weight in grams of the sheet having an area of 10 × 10 cm² by the volume in cubic centimeters calculated from the thickness measured according to JIS-B-7509 (where JIS stands for Japanese Industrial Standards).

2. STRENGTH AT BREAKAGE AND ELONGATION AT BREAKAGE

The values were determined in accordance with JIS-K-6301.

3. PEEL STRENGTH

The value was determined in accordance with JIS-S-5017.

4. VELOCITY OF VAPOR PERMEABILITY

The value was determined in accordance with JIS-K-6549.

5. SUPPLENESS (FLEXURAL HARDNESS)

A test piece having a length of 9 cm and a width of 2.5 cm was cut out from the microporous structure obtained in accordance with the process of the invention. A test stand having a holding means on its surface was placed horizontally. One end in the lengthwise direction of the test piece was inserted into the holding means to a point 2 cm from said end, and fixed thereto vertically with respect to the surface of the test stand. Force was exerted on the point 2 cm from the other end, to bend the test piece in the L-shaped configuration. The distance between the surface of the test stand and the point on which the force had been exerted was maintained at 4 cm. This state was maintained for 5 minutes, and the test piece was released from the restraint of the force. The repulsive force (F) shown by the test piece upon this release was measured, and the value of the repulsive force per unit width of the test piece was calculated.

Suppleness (flexural hardness) = F/2.5 (g/cm)

6. DIELECTRIC LOSS FACTOR

The dielectric loss factor was measured in accordance with ASTM D-150-68 using a mutual induction bridge-type apparatus (product of Ando Denki Kabushiki Kaisha) at a temperature of 25° C. and a frequency of $10^6$ cycles/second.

7. DYEABILITY

This is expressed by the saturated amount of dye fixed (mg dye/g polyurethane microporous structure) which as measured when the microporous structure was dip-dyed using an acid dye, basic dye or metal-containing dye under the following conditions.

Acid dye: C.I. Acid Blue 127
Cationic dye: C.I. Basic Blue 5
Metal-containing dye: C.I. Acid Brown 75
Assistant:
  Ammonium sulfate (in the case of the acid dye)
  Acetic acid (in the case of the basic dye)
  Sodium sulfate (in the case of the metal-containing dye)
Goods-to-liquor ratio: 1:50
Dyeing temperature: 75° C.

The following Examples and Comparative Examples will illustrate the present invention in greater detail.

EXAMPLE 1

194 parts of polyester glycol having a molecular weight of 1,720 and containing 0.08 % of nitrogen atom which had been prepared from adipic acid, ethylene glycol and N-methyl diethanolamine and 100 parts of diphenylmethane diisocyanate were dissolved in 73 parts of methylethyl ketone, and the solution was maintained at 70° C. for 1.5 hours with stirring. Then, a solution of 25 parts of 1,4-butanediol in 140 parts of methylethyl ketone was added at 50° C. After 30 minutes, the solution was again maintained at 70° C., and while diluting the solution with 1,065 parts of methylethyl ketone, benzyl chloride was added to alkylate the nitrogen atom contained in the polyester portion. After 4 hours, a methyl ethyl ketone slurry containing polyurethane with 0.1 % nitrogen in a concentration of 20 % was obtained. The slurry had a C.A.H.P. of 0.13. 35 parts (per 100 parts of polyurethane slurry, corresponding to 70 % of the critical amount of water added) was added to this slurry while stirring by a homomixer. There was obtained a white creamy aqueous slurry.

The slurry was coated on the surface of a polyester film and exposed in an atmosphere held at 35° C. and RH of 70 % for 1 hour, and then heat-treated for 15 minutes at 130° C. The resulting white polyurethane film was stripped off from the polyester film, and observed microscopically. It was found that the film became microporous. The properties of the resulting film are shown in Table 1.

A 1 mm thick non-woven fabric of polyethylene terephthalate fibers was immersed in the aqueous slurry obtained above, and squeezed to a thickness of 1 mm to coat the fabric with the aqueous slurry to a dry thickness of 0.45 mm. The coated fabric was exposed in an atmosphere held at 35° C. and RH of 70 % for 1.5 hours, and then heat-treated for 15 minutes at 130° C.

The resulting sheet-like material had good suppleness and feel, and proved useful as a leather substitute. When the sheet-like material was treated for 8 seconds with high frequency at 5 MC/second and pressued at a pressure of 5 Kg/cm$^2$, the individual fibers of the sheet-like material were firmly bonded to each other. The properties of the resulting sheet-like material are shown in Table 1.

EXAMPLE 2

Sodium isothionate of 0.6 part was added with stirring to a solution of 194 parts of polyethylene adipate having an average molecular weight of 1,730 and 101 parts of diphenylmethane diisocyanate in 74 parts of methylethyl ketone, and the mixture was maintained at 70° C. for 1.5 hours. Then, a solution of 25 parts of 1,3-butanediol in 140 parts of methylethyl ketone was added at 50° C. After 30 minute, the mixture was again maintained at 70° C., and diluted with 1,066 parts of methylethyl ketone. After 4 hours, there was obtained a 20 % polyurethane slurry containing —SO$_3$Na group which had a viscosity of 860 centipoises at 70° C. The C.A.H.P. of this slurry was 0.6 % in terms of the —SO$_2$O$^-$ content. The critical amount of water added of this slurry was 70 parts per 100 parts of the urethane slurry. 50 parts (which corresponded to 70 % of the critical amount of water added) of water was added to 100 parts of this slurry while stirring by a homomixer to form a white creamy stable aqueous slurry.

A continuous microporous film was produced using this aqueous slurry by the same procedure as in Example 1.

A leather-like sheet was produced in the same way as shown in Example 1. The properties of the microporous film and the leather-like sheet are shown in Table 1.

EXAMPLE 3

195 parts of polyethylene adipate having an average molecular weight of 1,730, 100 parts of diphenylmethane diisocyanate, 0.8 g of potassium tartrate, and 25 parts of 1,4-butanediol were reacted in methyl ethyl ketone in the same way as in Example 2 to form a 20 % polyurethane-methylethyl ketone slurry containing —COOK$^-$ group which had a viscosity of 170 centipoises at 70° C. (C.A.H.P. was 0.30 as the percentage of —COO$^-$ group content.) The critical amount of water added of this slurry was 35, and using 80 % of the critical amount of water, an aqueous slurry was formed in the same way as in Example 1. A microporous film and an impregnation coated substrate were produced in the same way using this aqueous slurry. The properties of these products are shown in Table 1.

EXAMPLE 4

194 parts of polyester glycol having a molecular weight of 1,710 containing 0.17 % of sulfur atom which had been obtained from adipic acid, ethylene glycol, thiodiethanol and benzyl chloride, 101 parts of diphenylmethane diisocyanate and 26 parts of 1,4-butanediol were reacted in methyl ethyl ketone in the same way as in Example 2 to form a 20 % polyurethane-methylethyl ketone slurry containing group. The critical amount of water of this slurry was 40. (C.A.H.P. was 0.8 as the group content.) Using 70 %, based on the critical amount of water, of water, an aqueous slurry was prepared in the same way as in Example 1. A microporous film and an impregnation coated substrate were produced using the aqueous slurry. The properties of these products are shown in Table 1.

EXAMPLE 5

Polyester glycol having a molecular weight of 1,680 containing group which had been obtained from adipic acid, ethylene glycol and bis-($\beta$-hydroxyethyl) phosphate, diphenylmethane diisocyanate and 26 parts of 1,4-butanediol were reacted in ethyl acetate in the same way as in Example 1 to form a 20 % polyurethane slurry containing 0.1 % of group, which had a viscosity of 370 centipoises at 70°C. The group of this slurry was neutralized with sodium hydroxide. The neutralized 20% polyurethaneethyl acetate solution had C.A.H.P. of 0.6 % as the group content.

When a solution of 1.4 parts of sodium hydroxide in 32 parts (corresponding to 80 % of the critical amount of water of this slurry) of water was added to 100 parts of this slurry while stirring by a homomixture there was obtained a white creamy stable aqueous slurry. A continuous microporous film was prepared using this aqueous slurry in the same way as in Example 1.

The resulting slurry was coated on the surface of the coated substrate obtained in Example 4. It was exposed to an atmosphere held at 30° C. and a relative humidity of 70 % for 1.5 hours, and then heat-treated at 130° C. for 15 minutes. The properties of the resulting microporous film and the coated substrate are shown in Table 1.

EXAMPLE 6

194 parts of polyester glycol containing 0.16 % of phosphorus atom which had been prepared from adipic acid, ethylene glycol, and methyl bis-$\beta$-hydroxyethyl phosphine benzyl chloride, 100 parts of diphenylmethane diisocyanate, and 25 parts of 1,4-butanediol were reacted in the same way as in Example 1 in a mixed solvent consisting of tetrahydrofuran and methylethyl ketone in a weight ratio of 1:6 to form a 20 % polyurethane slurry containing group which had a viscosity of 750 centipoises at 70° C. The C.A.H.P. of this slurry was 0.4 % as the group content. The critical amount of water added of this slurry was 65 parts per 100 parts of the urethane slurry. 52 parts (corresponding to 80 % of the critical amount of water) of water was added to 100 parts of this slurry while stirring by a homomixer to form a white creamy stable aqueous slurry.

A microporous film and a coated substrate were produced using this aqueous slurry. The properties of these products are shown in Table 1.

COMPARATIVE EXAMPLE 1

A solution of 101 parts of polyethylene adipate having an average molecular weight of 1,730, 7 parts of polyoxyethylene glycol having an average molecular weight of 1,520 and 58 parts of diphenyl methane diisocyanate in 41 parts of methyl ethyl ketone was maintained with stirring at 70° C. for 1.5 hours. Then, a solution of 15 parts of 1,4-butanediol in 79 parts of methylethyl ketone was added at 50° C. After 30 minutes, the solution was again maintained at 70° C., and diluted with 600 parts of methylethyl ketone. After 4 hours, there was obtained a 20 % polyurethane slurry having 4 % by weight, based on the polyurethane, of a polyoxyethylene chain as a hydrophilic group. The critical amount of water added of this slurry was 50. Water was added in an amount corresponding to 70 % of the critical amount, to the resulting slurry while stirring by a homomixer. There was obtained a white creamy stable aqueous slurry.

A microporous film and a coated substrate were produced in the same way as in Example 1. The properties of these products are shown in Table 1.

When this microporous sheet was subjected to a high frequency bonding under the same conditions as used in Example 1. However, it hardly showed adhesiveness.

COMPARATIVE EXAMPLE 2

194 parts of polyethylene adipate having an average molecular weight of 1,730, 101 parts of diphenylmethane diisocyanate and 25 parts of 1,4-butanediol were reacted in methyl ethyl ketone to form a 20 % polyurethane-methylethyl ketone slurry. Even when water was added to this slurry, it did not become an aqueous slurry. When 1 part of water was added to 100 parts of the slurry, water was freed. When the slurry as such was coated on a polyester film and gelled under the same conditions as shown in Example 1, a microporous film was not formed. The film thus obtained had the properties shown in Table 1.

40 parts of water was added to 100 parts of the above slurry, and they were vigorously stirred. The resulting slurry was coated on a polyester film, but separated into a polymer layer and a water layer, making it impossible to form a uniform film which was far from microporous.

COMPARATIVE EXAMPLE 3

Water was added in an amount corresponding to 5 % and 140 % respectively of the critical amount of water, to the 20 % polyurethane-methylethyl ketone slurry containing and having a critical amount of water of 50 which was obtained in Example 1. Each of the resulting slurries was coated on a polyester film, and gelled and dried under the same conditions as in Example 1. The slurry to which 140 % based on the critical amount, of water had been added separated into water and the slurry components. The properties of the resulting films are shown in Table 1.

COMPARATIVE EXAMPLE 4

A 20 % polyurethane-methyl ethyl ketone slurry containing 2.0 % of $-SO_2O^-$ group was prepared under the same conditions as in Example 1 using the same material as used in Example 1. When water was added to the slurry, an aqueous latex was obtained. The critical amount of water was infinite. Water was added to this slurry in an amount of 50 parts and 100 parts respectively per 100 parts of the slurry. Each of the resulting aqueous slurries was coated on a polyester film, and gelled and dried under the same conditions as in Example 1. The properties of the resulting films are shown in Table 1.

COMPARATIVE EXAMPLE 5

A 20 % polyurethane-methylethyl ketone slurry containing 0.01 % of $-SO_2O^-$ group was prepared under the same conditions as in Example 1 using the same materials as used in Example 1. The critical amount of water of this slurry was 3. An aqueous slurry was prepared by adding to the slurry 2.4 parts (corresponding to 80 % of the critical amount) of water. The resulting aqueous slurry was coated on a polyester film, and gelled and dried under the same condition as in Example 1. The properties of the resulting film are shown in Table 1.

EXAMPLE 7

A 1 mm thick polyester non-woven fabric was dipped in the aqueous slurry of polyurethane containing group which had been prepared in Example 1 to fill the fabric with the slurry. Then, the fabric was squeezed by nip rollers placed with a distance of 0.06 mm from each other. Immediately then, the aqueous slurry containing $-SO_2O^-$ group which was obtained in Example 2 was sprayed onto the fabric, and the fabric was squeezed with nip rolls spaced from each other by a distance of 0.1 mm.

The aqueous slurry obtained in Example 1 was coated on this non-woven fabric to a thickness of 0.45 mm after drying. It was then immediately exposed to an atmosphere held at 35° C. and a relative humidity of 70 % for 1 hour, then to an atmosphere held at 60° C. and a relative humidity of 50 % for 30 minutes, and then dried at 130° C. for 10 minutes. The properties of the resulting sheet-like material are shown in Table 1.

The sheet obtained had good suppleness and feel and high peel strength, and could be easily processed by high frequency.

A coating solution comprising a dyed urethane resin was top coated on the sheet-like material so obtained. Then, it was subjected to high frequency embossing and crumpling, and men's shoes were produced from it. It well conformed to the feet and was light in weight and had good durability. As a leather substitute, this sheet-like material was even better than natural leather.

Table 1

| | | Example No. 1 | Example No. 2 | Example No. 3 |
|---|---|---|---|---|
| Properties of the Polymer Solution | Hydrophilic group (content %) | $-\overset{|}{N}-^\oplus$ (0.05) | $:SO_2C^\ominus$ (0.1) | $-CCO^\ominus$ (0.1) |
| | N Content (%) of urethane group | 3.5 | 3.5 | 3.5 |
| | Solvent | MEK | MEK | MEK |
| | Concentration (%) | 20 | 20 | 20 |
| | C. A. H. P. | 0.13 | 0.60 | 0.30 |
| | C. A. W. | 50 | 70 | 35 |
| | Water added | 35 (70%) | 50 (70%) | 28 (80%) |
| Properties of the Product | Apparent Density ** | ① 0.54 ② 0.379 | ① 0.50 ② 0.376 | ① 0.61 ② 0.382 |
| | Moisture Permeability Velocity ** | ① 9.6 ② 6.9 | ① 14.6 ② 9.7 | ① 7.8 ② 5.4 |
| | Softening Point (°C) | 171 | 168 | 172 |
| | Dielectric Loss factor | 0.572 | 0.568 | 0.724 |
| | Dyeability *** | (a) 40 (c) 42 | (b) 32 (c) 28 | - |
| | Flexural hardness | 3.1 | 3.1 | - |
| | Peel Strength | 1.3 | 1.2 | - |
| | Thickness | ① 0.45 ② 1.35 | ① 0.43 ② 1.33 | ① 0.43 ② 1.44 |

| | Example No. 4 | Example No. 5 | Example No. 6 |
|---|---|---|---|
| Properties of the Polymer Solution — Hydrophilic group (content %) | $-SO_3^\ominus$ (0.1) | $\rangle COO^\ominus$ (0.1) | $\rangle P^\oplus$ (0.1) |
| N Content (%) of urethane group | 3.5 | 3.5 | 3.5 |
| Solvent * | MEK | Ethyl acetate | MEK + tetra-hydrofuran |
| Concentration (%) | 20 | 20 | 20 |
| C.A.H.P. | 0.50 | 0.60 | 0.40 |
| C.A.W. | 40 | 40 | 65 |
| Water added | 28 (70%) | 32 (80%) | 52 (80%) |
| Properties of the Product — Apparent Density ** | ① 0.58 ② 0.380 | ① 0.56 ② 0.379 | ① 0.38 ② 0.375 |
| Moisture Permeability Velocity ** | ① 9.3 ② 6.7 | ① 12.5 ② 9.8 | ① 16.2 ② 10.5 |
| Softening Point (°C) | 162 | 168 | 170 |
| Dielectric Loss factor | 0.718 | 0.612 | 0.654 |
| Dyeability *** | - | - | - |
| Flexural Hardness | - | - | - |
| Peel Strength | - | - | - |
| Thickness | ① 0.45 ② 1.45 | ① 0.46 ② 1.46 | ① 0.46 ② 1.46 |

| | Comparative Example 1 | Comparative Example 2 | Comparative Example 3 |
|---|---|---|---|
| Hydrophilic group (content %) | $-(CH_2CH_2O)_n-$ | None | $\rangle P^\oplus$ (0.05) |
| N Content (%) of urethane group | 3.5 | 3.5 | 3.5 |
| Solvent * | MEK | MEK | MEK |
| Concentration (%) | 20 | 20 | 20 |
| C.A.H.P. | - | - | 0.13 |
| C.A.W. | 50 | less than 1 | 50 |
| Water added | 35 (70%) | - | 2.5(5%) 70(140%) |
| Apparent Density ** | ① 0.62 ② 0.381 | ① 1.18 | ① 1.15 ② 1.02 |
| Moisture Permeability Velocity ** | ① 10.2 ② 6.3 | ① 0.01 | ① 0.06 ② 0.14 |
| Softening Point (°C) | 148 | 172 | - |
| Dielectric Loss factor | 0.380 | 0.382 | - |
| Dyeability *** | (a) 5 (b) 5 (c) 7 | - | - |
| Flexural hardness | 3.2 | - | - |
| Peel Strength | 1.2 | - | - |
| Thickness | - | - | - |

| | Comparative Example 4 | Comparative Example 5 | Example 7 |
|---|---|---|---|
| Properties of the Polymer Solution — Hydrophilic group (content %) | $\rangle SO_2O^\ominus$ (2.0) | $\rangle SO_2O^\ominus$ (0.01) | Polymer of Example 1 (for dipping and coating) Polymer of Example 2 (for spraying) |
| N Content (%) of urethane group | 3.5 | 3.5 | |
| Solvent * | MEK | MEK | |
| Concentration (%) | 20 | 20 | |
| C.A.H.P. | 0.60 | 0.60 | |
| C.A.W. | ∞ | 3 | |
| Water added | 50/100 | 2(70%) | |
| Apparent Density ** | ① 1.24 ② 1.28 | ① 1.24 | ② 0.378 |
| Moisture Permeability Velocity ** | ① 0.08 ② 0.07 | ① 0.18 | ② 7.5 |
| Softening Point (°C) | - | - | - |
| Dielectric Loss factor | - | - | - |
| Dyeability | - | - | - |
| Flexural hardness | - | - | 2.5 |
| Peel Strength | - | - | 1.9 |
| Thickness | - | - | - |

\* MEK = methyethyl ketone

\*\* ① measured values for the microporous film
② measured values for the microporous sheet \*\*\* (a) acid dye
(b) cationic dye
(c) metal-containing

What is claimed is:

1. A process for producing a microporous structure, which essentially comprises the steps of:
   1. preparing a solution or suspension of a resinous component in an organic solvent having a boiling point lower than 120°C., the solubility at 25°C. of water in said organic solvent being from 1 to 50 g per 10 g of said solvent, said solution or suspension having a solid resin content of 5 to 30% by weight, said resinous component comprising more than 70% by weight of a polyurethane elastomer selected from the group consisting of
   A. a polyurethane elastomer free from polyoxyethylene segments which contains an ionic hydrophilic group, in an amount of 10 to 98% by weight of the critical amount of hydrophilic groups in the elastomer, which is selected from the group consisting of and B. a mixture of at least 50% by weight of said polyurethane elastomer (A) with not more than 50% by weight of a polyurethane elastomer free from hydrophilic segments;

2. mixing the resulting organic solvent solution or suspension with water in an amount of from 10 to 95% by weight of the critical amount of water to prepare a dispersion;

3. coating or impregnating a substrate with the resulting dispersion;

4. selectively evaporating said organic solvent from the coated or impregnated substrate at a temperature not higher than 80°C. and at least 10°C. lower than the boiling point of the lowest boiling constituent of said organic solvent, thereby to gel said resinous component; and 5. drying the product obtained in step (4).

2. The process of claim 1 wherein said polyurethane elastomer containing no polyoxyethylene segments is a polyurethane elastomer consisting of (a) a long-chain diol of a polyester having a molecular weight of 500 to 4,000, (b) an organic diisocyanate and (c) a bifunctional active hydrogen compound having a molecular weight of 60 to 450, at least one of said components (a), (b) and (c) having an ionic hydrophilic group selected from the group consisting of and the urethane linkage expressed by of the polyurethane elastomer containing 1.5 to 6.5 % by weight, based on the polyurethane elastomer, of nitrogen.

3. The process of claim 1 wherein said polyurethane elastomer containing no hydrophilic segments is a polyurethane elastomer consisting of (a) a long chain diol of a polyester having a molecular weight of 500 to 4,000, (b) an organic diisocyanate and (c) a bifunctional active hydrogen compound having a molecular weight of 60 to 450, the urethane linkage expressed by in said polyurethane elastomer containing 1.5 to 6.5 % by weight, based on the polyurethane elastomer, of nitrogen.

4. The process of claim 1 wherein said step (3) is carried out in two stages, the first stage comprising impregnating the substrate with the resulting dispersion, and the second stage comprising further coating on the impregnated substrate a dispersion containing a polyurethane elastomer (A) having an ionic hydrophilic group having an ion of the opposite polarity to the ion of the hydrophilic group possessed by the polyurethane elastomer (A) which is contained in the dispersion formed in step (2).

* * * * *